United States Patent
Servia Rodriguez et al.

(10) Patent No.: US 12,326,849 B2
(45) Date of Patent: Jun. 10, 2025

(54) TECHNIQUES FOR DELEGATED INTER-PARTY PRIVATE SET INTERSECTION

(71) Applicant: CrowdStrike, Inc., Sunnyvale, CA (US)

(72) Inventors: Sandra Servia Rodriguez, Cambridge (GB); Calin-Bogdan Miron, Nottingham (GB); Marian Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/358,728

(22) Filed: Jul. 25, 2023

(65) Prior Publication Data
US 2025/0036611 A1  Jan. 30, 2025

(51) Int. Cl.
*G06F 16/23* (2019.01)
*G06F 21/62* (2013.01)

(52) U.S. Cl.
CPC .......... *G06F 16/23* (2019.01); *G06F 21/6245* (2013.01)

(58) Field of Classification Search
CPC .............................. G06F 16/23; G06F 21/6245
See application file for complete search history.

(56) References Cited

U.S. PATENT DOCUMENTS

| | | | |
|---|---|---|---|
| 2019/0349191 A1* | 11/2019 | Soriente | H04L 9/0844 |
| 2019/0378599 A1* | 12/2019 | Amisano | G06F 16/951 |
| 2021/0194856 A1* | 6/2021 | Laine | H04L 9/0643 |
| 2022/0004654 A1 | 1/2022 | Patel et al. | |
| 2023/0053566 A1* | 2/2023 | Horne | G06F 21/6227 |
| 2023/0359631 A1* | 11/2023 | Badrinarayanan | G06F 21/602 |

FOREIGN PATENT DOCUMENTS

WO 2022076038 A1 4/2022

OTHER PUBLICATIONS

Extended European Search Report Dated Dec. 5, 2024 for European Patent Application No. 24186639.1, 9 pages total.
Burt Kaliski, "Pseudorandom Function", In Encyclopedia of Cryptography and Security, Edited by Henk C. A. van Tilborg, 2005, p. 485.

(Continued)

*Primary Examiner* — Etienne P Leroux
*Assistant Examiner* — Oscar Wehovz
(74) *Attorney, Agent, or Firm* — Womble Bond Dickinson (US) LLP

(57) ABSTRACT

A method for detecting a private set intersection includes receiving a first plurality of transformed data elements from a first computing device, the first plurality of transformed data elements representing a transform by a pseudorandom function of a first plurality of data elements; receiving a second plurality of transformed data elements from a second computing device, the second plurality of transformed data elements representing a transform by the pseudorandom function of a second plurality of data elements; and transmitting, by a processing device to the first computing device and the second computing device, an indication of a subset of transformed data elements that are present in both the first plurality of transformed data elements and the second plurality of transformed data elements.

20 Claims, 8 Drawing Sheets

(56) References Cited

OTHER PUBLICATIONS

Melissa Chase et al., "Private Set Intersection in the Internet Setting From Lightweight Oblivious PRF", Advances in Cryptology—Crypto 2020, 28 pp. total.

Vladimir Kolesnikov et al., "Efficient Batched Oblivious PRF with Applications to Private Set Intersection", Proceedings of the 2016 ACM SIGSAC Conference on Computer and Communications Security, Oct. 24-28, 2016, pp. 818-829.

Amanda C. Davi Resende et al., "Faster Unbalanced Private Set Intersection", Financial Cryptography and Data Security: 22nd International Conference, Feb. 26-Mar. 2, 2018, pp. 203-221.

Daniel Kales et al., "Mobile Private Contact Discovery at Scale", SEC'19 Proceedings of the 28th USENIX Conference on Security Symposium, Aug. 2019, pp. 1447-1464.

Sílvia Casacuberta et al., "SoK: Oblivious Pseudorandom Functions", 2022 IEEE 7th European Symposium on Security and Privacy (EuroS&P), Jun. 6-10, 2022, pp. 625-646.

Hao Chen et al., "Labeled PSI from Fully Homomorphic Encryption with Malicious Security", CCS'18 Proceedings of the 2018 ACM SIGSAC Conference on Computer and Communications Security, Oct. 2018, pp. 1223-1237.

\* cited by examiner

TECHNIQUES FOR DELEGATED INTER-PARTY PRIVATE SET INTERSECTION

TECHNICAL FIELD

Aspects of the present disclosure relate to determining set intersection, and more particularly, to determining set intersection in a secure environment utilizing pseudorandom functions.

BACKGROUND

Private set intersection (PSI) allows two parties, each having a set of data, to find elements that the sets have in common (e.g., an intersection) without revealing the data elements of their sets to each other. PSI may be used in a number of technological environments. For example, PSI may be utilized between two servers to determine if they share a common user and/or a common password. In such a scenario, it may be important to be able to determine the common intersection (e.g., a same user is using the same password on two different systems) without divulging the contents that are being compared (e.g., the usernames and/or passwords).

PSI can be useful in scenarios in which the data is security- and/or privacy-related. For example, PSI could be utilized to determine if a particular patient's DNA includes genes in common with certain diseases without revealing the patient's DNA. Similarly, technological diagnostics programs may wish to identify whether certain characteristics of a user's computer system are indicative of a larger problem without revealing the full contents of the user's particular configuration. As the amount of data that is maintained on systems, and the interaction of those systems, increases, the need for an effective PSI protocol also increases.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
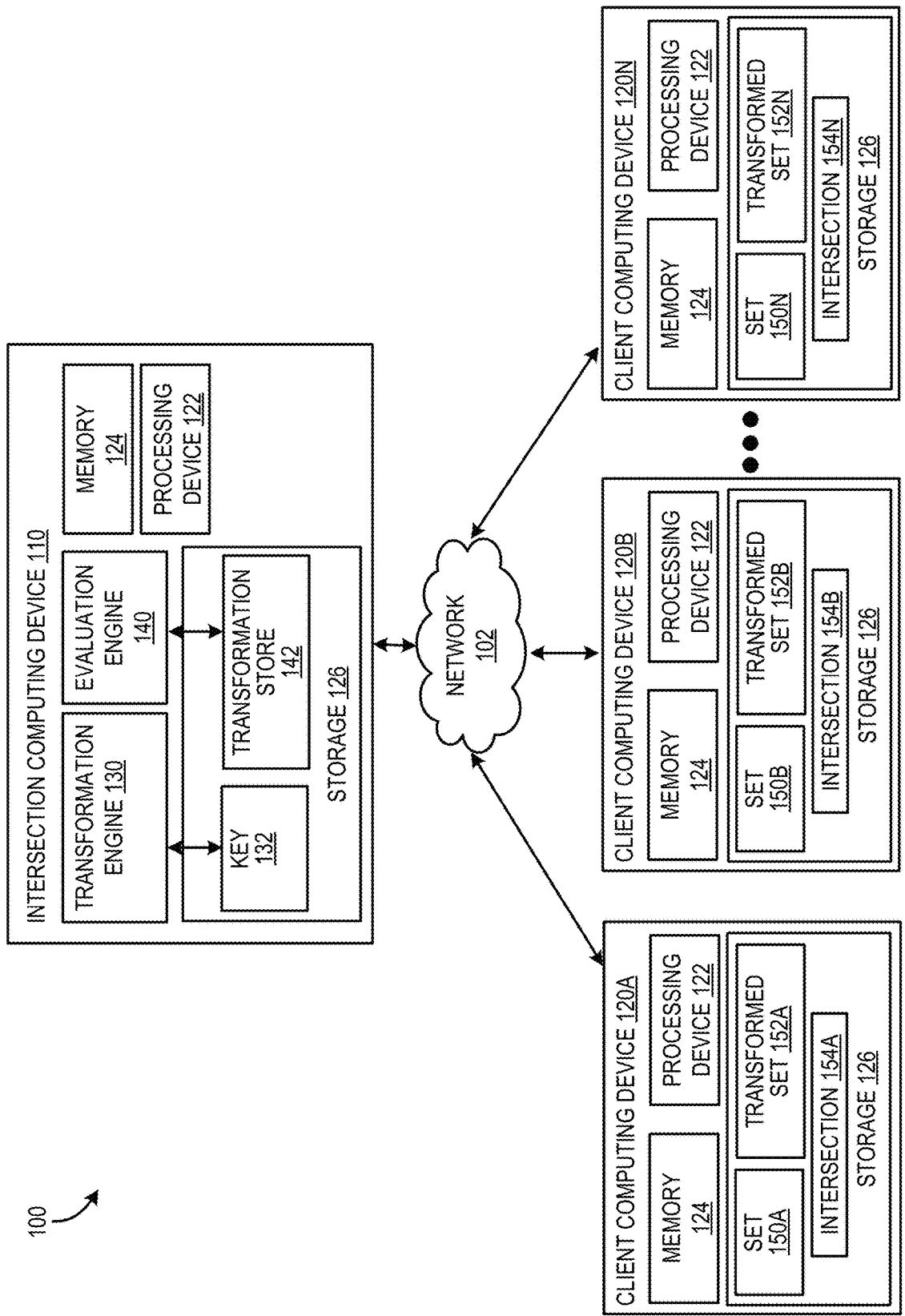
FIG. 1 is a block diagram that illustrates an example system, according to some embodiments of the present disclosure.

As described above, PSI refers to the problem in which two parties, each holding a set, wish to find the intersection of their sets without revealing any additional information about the sets themselves. Several PSI protocols have been proposed to date. They allow one party to learn the result of the intersection whereas the other party learns nothing. Solutions for delegated PSI, which involves the use of a third party to aid in the computation of the intersection, have also been proposed, and in some cases, they allow parties to learn the intersection amongst all parties' sets, a problem known as multiparty PSI.

However, little attention has been paid to the problem in which each party needs to learn whether items in their set are also present in any other party's set without learning the identity of the parties with whom they have a match. Note that this problem is more complex than the traditional two-party PSI problem whose goal is for one party to learn the intersection of its set with the other party's set, as well as from the multiparty PSI problem whose goal is for either a designated party or all parties to learn which elements appear simultaneously in all parties' sets. Executing a two-party PSI protocol between each two parties may not be a feasible solution in some scenarios for a number of reasons. For example, a two-party PSI protocol violates the requirement that the parties should not learn with which parties they have matches because, if there is a match, it must be the other party. In addition, a two-party PSI protocol may be computationally inefficient when a large number of parties are involved, as each party would execute a PSI protocol with each one of the other parties. Similarly, some multiparty PSI protocols may not be suitable because they may compute the intersection with all other parties and they also may not hide the matching party to the involved parties.

The present disclosure addresses the above-noted and other deficiencies by providing techniques that use two non-colluding entities. For example, one entity (e.g. a transformation engine) may provide transformation services (e.g., parties can query this service to obtain a pseudorandom function (PRF) on every element of their set without having access to a key used by the transformation engine, so that the output can be securely shared with untrusted third-parties), while another entity (e.g., an evaluation engine) evaluates the transformed values. In some embodiments, the transformation engine may act as the sender in an oblivious pseudorandom function (OPRF) protocol that enables each party to compute a PRF on every element of its set without having access to a key used by the transformation engine, and more importantly, without disclosing their private set to the transformation engine.

In some embodiments, a multi-point OPRF protocol may be utilized that enforces the use of the same key in consecutive executions of the protocol so that the same transformation is applied to each party's set, allowing for direct computation of the intersection in the PRF output domain. In order to reduce the computation costs in the parties, as well as for impeding and/or preventing them from learning with which other party or parties they have a match, embodiments of the present disclosure may outsource the detection of the intersection to the evaluation engine. For example, after the PRF transformation, each party may send its PRF output set to the evaluation engine which may check for matches between elements in the provided sets and notify respective parties about the elements matching in their sets. In some embodiments, the evaluation engine may store each set into a hash table (e.g., a Cuckoo hash) for fast lookups. In some embodiments, once the sets of every party have been checked, the transformation engine may delete its key and the evaluation engine may delete its hash tables in order to enhance security.

The embodiments described herein provide improvements both to the operations of the respective computing devices implementing the protocol, and to the technology associated with computer security. By offloading the calculation of the set intersection to a centralized server function, the determination of the intersection of the sets of large numbers of computing devices (e.g., thousands and/or millions) may be more efficiently processed. For example, the calculations associated with a pairwise comparison of sets between a large number of computing devices may vastly exceed the computation required for one centralized server to check the intersections between all of the computing devices. Moreover, the use of the centralized server may allow for the source of the set intersection to be masked. For example, a particular computing device may learn that its set has a member that is duplicated elsewhere, but not the identity of where it is duplicated. This quality may protect from bad actors within the computing devices attempting to learn which systems have a similar member in their sets.

Embodiments of the present disclosure may improve the technology associated with computer security by allowing for the private and secure comparison of set members, while hiding the identity of the owners of the sets and the set contents themselves. As a non-limiting example, embodiments of present disclosure may provide the ability to determine if a particular password of a computing device is shared. By determining if a password in its set of passwords exists on another device, a computing device may be able to alert the user associated with the password to change it. As noted above, this may be accomplished without learning which system has the same password, reducing an opportunity to exploit this knowledge.

FIG. 1 is a block diagram that illustrates an example system 100, according to some embodiments of the present disclosure. FIG. 1 and the other figures may use like reference numerals to identify like elements. A letter after a reference numeral, such as "120A," indicates that the text refers specifically to the element having that particular reference numeral. A reference numeral in the text without a following letter, such as "120," refers to all of the elements in the figures bearing that reference numeral.

As illustrated in FIG. 1, the system 100 includes a first computing device 110 (also referred to herein as an intersection computing device 110) and a plurality of second computing devices 120 (also referred to herein as client computing devices 120). In FIG. 1, a first client computing device 120A, a second client computing device 120B, up to an Nth client computing device 120N are illustrated merely as examples. It will be understood that more or fewer client computing devices 120 may be present in some embodiments of the present disclosure. The intersection computing device 110 and the client computing devices 120 may each include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

In some embodiments, memory 124 may be volatile memory that loses contents when the power to the computing device is removed or non-volatile memory that retains its contents when power is removed. In some embodiments, memory 124 may be non-uniform access (NUMA), such that memory access time depends on the memory location relative to processing device 122.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like. It should be noted that although, for simplicity, a single processing device 122 is depicted in the intersection computing device 110 and the client computing devices 120 depicted in FIG. 1, other embodiments of the intersection computing device 110 and/or the client computing devices 120 may include multiple processing devices 122, storage devices 126, or other devices.

The storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The intersection computing device 110 and/or the client computing devices 120 may comprise any suitable type of computing device or machine that has a programmable processor including, for example, server computers, desktop computers, laptop computers, tablet computers, smartphones, set-top boxes, etc. In some examples, the intersection computing device 110 and/or the client computing devices 120 may comprise a single machine or may include multiple interconnected machines (e.g., multiple servers configured in a cluster). The intersection computing device 110 and/or the client computing devices 120 may be implemented by a common entity/organization or may be implemented by different entities/organizations.

The intersection computing device 110 and the client computing devices 120 may be coupled to each other (e.g., may be operatively coupled, communicatively coupled, may communicate data/messages with each other) via network 102. Network 102 may be a public network (e.g., the internet), a private network (e.g., a local area network (LAN) or wide area network (WAN)), or a combination thereof. In one embodiment, network 102 may include a wired or a wireless infrastructure, which may be provided by one or more wireless communications systems, such as a WIFI™ hotspot connected with the network 102 and/or a wireless carrier system that can be implemented using various data processing equipment, communication towers (e.g., cell towers), etc. The network 102 may carry communications (e.g., data, message, packets, frames, etc.) between the intersection computing device 110 and/or the client computing devices 120.

The intersection computing device 110 may be configured to provide a transformation engine 130 and an evaluation engine 140. The configuration of the transformation engine 130 and/or the evaluation engine 140 illustrated in FIG. 1 is merely for the purposes of illustration, and is not intended to limit the embodiments of the present disclosure.

The transformation engine 130 may be configured to perform a transformation operation on sets 150 that are transmitted (e.g., over the network 102) to the intersection computing device 110 to generate a transformed set 152. In some embodiments, the first client computing device 120A may provide values corresponding to a first set 150A to the transformation engine 130, and the transformation engine 130 may return a first transformed set 152A. A second client computing device 120B may provide values corresponding to a second set 150B to the transformation engine 130, and the transformation engine 130 may return a second transformed set 152B. An $N^{th}$ client computing device 120N may provide values corresponding to an $n^{th}$ set 150N to the transformation engine 130, and the transformation engine 130 may return an $n^{th}$ transformed set 152N, and so on.

In some embodiments, a first client computing device 120A may execute a protocol (e.g., an OPRF protocol) with the transformation engine 130 utilizing values corresponding to a first set 150A to generate a first transformed set 152A. In some embodiments, the first transformed set 152A may be generated as a result of an OPRF protocol executed between the first client computing device 120A and the transformation engine 130. In some embodiments, the second transformed set 152B may be generated as a result of an OPRF protocol executed between the second client computing device 120B and the transformation engine 130. In some embodiments, the Nth transformed set 152N may be generated as a result of an OPRF protocol executed between the Nth client computing device 120N and the transformation engine 130.

The set 150 may include one or more data elements. For example, the set 150 may include usernames, passwords, or other data values for which an intersection is to be determined with respect to the other client computing devices 120. The contents of the data elements of the set 150 are not limited by the examples of FIG. 1, but may instead include any data value that may be manipulated mathematically utilizing a pseudorandom function, as described further herein.

In some embodiments, the transformation engine 130 may utilize a pseudorandom function (PRF) to generate the transformed set 152 of data values from the initial set 150 of data values. A PRF is a deterministic function of a key and an input that is indistinguishable from a truly random function of the input. For example, if s is a security parameter, k is a key of length s bits, and F(k,x) (or $F_k(x)$) is a function of key k and input x, then F is a pseudorandom function if F can be computed in polynomial time in s and if k is random, then F cannot be distinguished from a random function in polynomial time.

In some embodiments, the transformation engine 130 and the client 120A may execute an oblivious pseudorandom function (OPRF) protocol to generate the transformed set 152 of data values from the initial set of data values 150. An OPRF according to some embodiments of the present disclosure is a cryptographic primitive that allows a sender to choose or learn a PRF key k and a receiver to learn the PRF output $OPRF_k(x_1), \ldots, OPRF_k(x_n)$ on its inputs $x_1, \ldots,$ $x_n \in X$. Nothing about the receiver's inputs is revealed to the sender and nothing about the key k is revealed to the receiver.

In many OPRF applications, such as PSI, one may obliviously evaluate a PRF more than once. If the OPRF allows for consecutive evaluations with respect to the same key, it may be referred to as a multi-point OPRF.

Figure 2A:
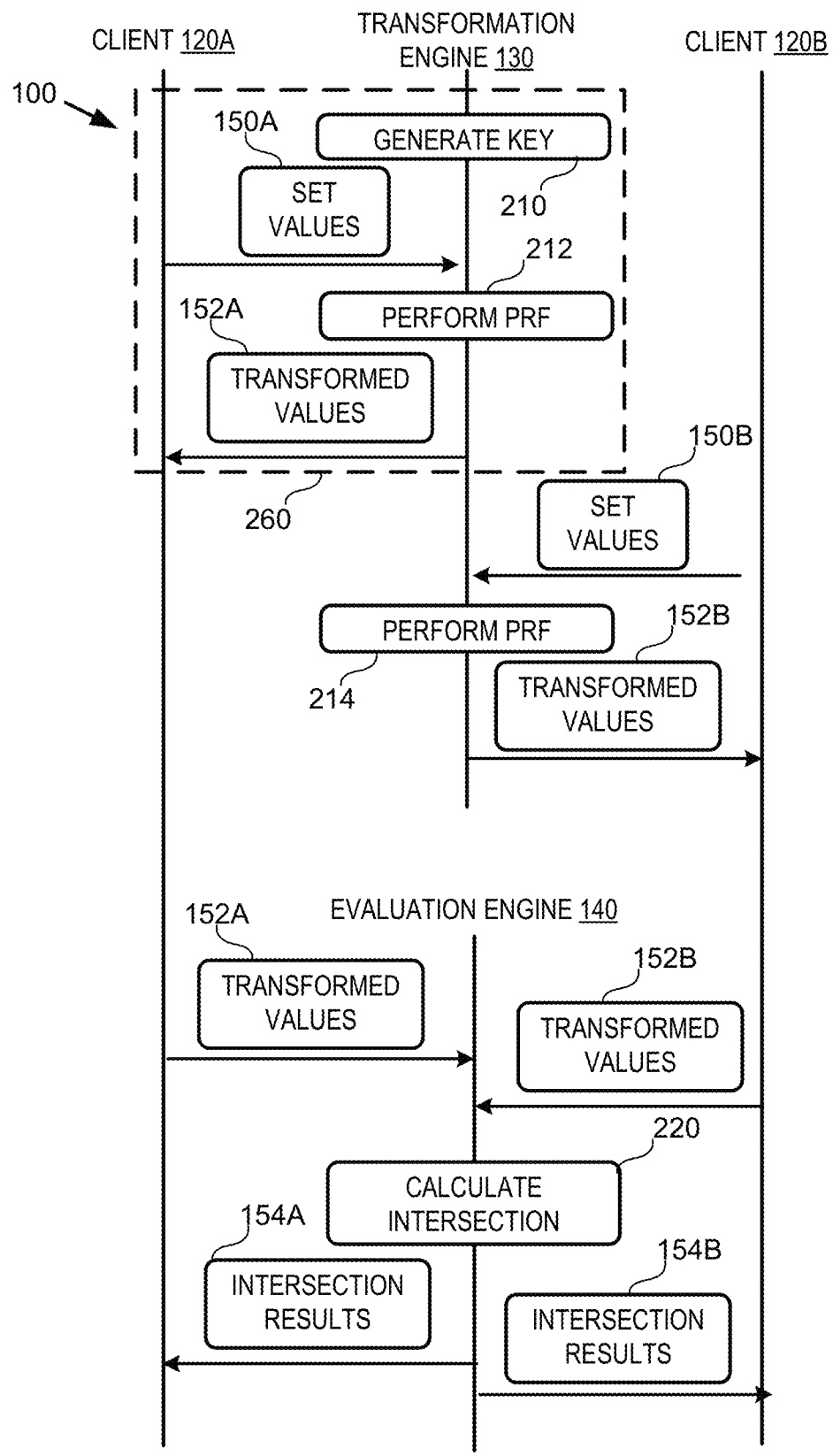
FIG. 2A is a flow diagram that illustrates operations of the transformation engine and/or the evaluation engine, in accordance with some embodiments of the present disclosure.

FIG. 2A is a flow diagram that illustrates operations of the transformation engine 130 and/or the evaluation engine 140, in accordance with some embodiments of the present disclosure. A description of elements of FIG. 2A that have been previously described will be omitted for brevity. The operations illustrated in FIG. 2A may be utilized, for example, by the system 100 of FIG. 1.

Referring to FIGS. 1 and 2A, at operation 210, the transformation engine 130 generates a key 132. In some embodiments, the key 132 may be a digital value, and may be randomly, or pseudorandomly, generated. The key 132 may be known to the transformation engine 130, but unknown to and/or concealed from the evaluation engine 140 and the client computing devices 120. In some embodiments, the transformation engine 130 and the evaluation engine 140 may be isolated from one another on the intersection computing device 110 to ensure that the transformation engine 130 and the evaluation engine 140 are unable to collude with one another. For example, containers and/or virtual machines may be utilized to isolate the transformation engine 130 from the evaluation engine 140. In some embodiments, as will be described further herein, the transformation engine 130 and the evaluation engine 140 may be provided on separate computing devices.

At some point after the key 132 is generated, the first client computing device 120A may send its set 150A of data values to the transformation engine 130. The transformation engine 130 may compute the pseudorandom function at operation 212 utilizing the key 132 and the set of values 150A.

An example of a pseudorandom function (PRF) may be such that for a given input set of $\{a_1, a_2, \ldots, a_n\}$ and a key a, it generates a set of transformed values 152 of $\{a_1', a_2', \ldots, a_n'\}$ given by:

$$\forall i, 1 \le i \le n$$

$$a_i' = (a_i)^\alpha$$

The key $\alpha$ is chosen in such a way that it is computationally difficult to obtain $\alpha_i'$ without knowing $\alpha$.

The transformed values 152A that correspond to the set 150A from the first client computing device 120A may be transmitted back (e.g., over network 102) to the first client computing device 120A, and may be stored on the first client computing device 120A (e.g., in storage device 126).

The process of generating transformed values 152 may be repeated with the second client computing device 120B. Namely, a set 150B of data values may be transmitted to the transformation engine 130, which may perform an PRF operation 214 utilizing the key 132 to generate transformed values 152B. The transformed values 152B may be sent back to the second client computing device 120B.

In some embodiments, the use of the key 132 to generate the transformed values 152 from the set 150 of data values using the PRF operation (e.g., PRF operation 214) may be part of an OPRF protocol 260 between the client computing device 120 and the transformation engine 130. The OPRF protocol 260 is jointly executed between the client computing device 120 and the transformation engine 130 in order to transform the set 150 of data values in a way that the transformation engine 130 does not get to learn either the data values of the original set 150 or the data values of the transformed set 152 and the client computing device 120 does not get to learn the key 132.

The first client computing device 120A and the second client computing device 120B may both transmit their transformed values 152A, 152B to the evaluation engine 140. Because the pseudorandom functions performed by the transformation engine 130 were performed on the set values 150A, 150B using a same key 132, the evaluation engine 140 is able to compare the transformed values 152A, 152B to determine if there is an intersection. In some embodiments, the evaluation engine 140 calculates 220 an intersection between the transformed values 152 received from the client computing devices 120. Calculating an intersection between the two sets of transformed values may include, for each data element of the first transformed set 152A, determining if that data element is also present in the second transformed set 152B. For example, if the first set of transformed values 152A from the first client computing device 120A contains a same value as the second set of transformed values 152B from the second client computing device 120B, the evaluation engine 140 may transmit first intersection results 154A to the first client computing device 120A that indicates the subset of one or more shared values that are present in a set from another client computing device 120. For example, the first intersection results 154A may identify a subset of the first set of transformed values 152A that are also present in at least one other set of transformed values 152. In some embodiments, the first intersection results 154A may not identify the second client computing device 120B (or any other client computing device 120) as the source of the subset of intersected values. Similarly, the evaluation engine 140 may transmit second intersection results 154B to the second client computing device 120B that indicates a subset of one or more shared values that are present in a set from another client computing device 120. In some embodiments, the second intersection results 154B may not identify the first client computing device 120A (or any other client computing device 120) as the source of the subset of intersected values.

In some embodiments, in response to determining that there is an intersection between the first set 150A of the first client computing device 120A and another set 150 from another client computing device 120, the first client computing device 120A may perform remediation. For example, if the set 150 of data elements correspond to passwords, the first client computing device may generate an alert to the user associated with the password to warn them that their password is repeated elsewhere in another client computing device 120. Other types of remediation, such as locking or otherwise restricting the user account, may be possible without deviating from the embodiments of the present disclosure.

Figure 2B:
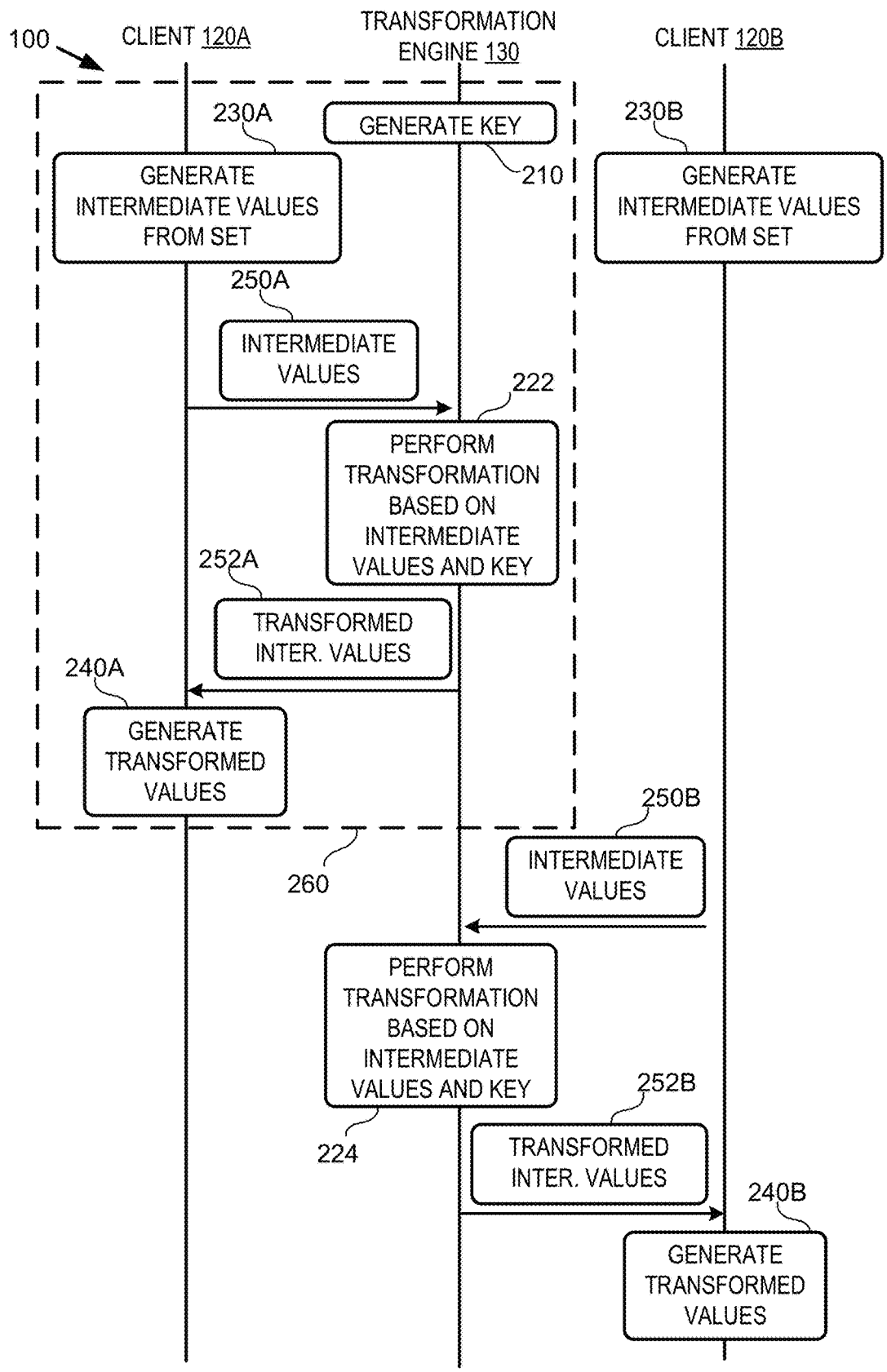
FIG. 2B is a modified flow diagram that illustrates the use of blinding for the transformation engine, in accordance with some embodiments of the present disclosure.

In FIG. 2A, the client computing device 120 provides its set directly to the transformation engine 130, but embodiments of the present disclosure are not limited to such a configuration. FIG. 2B is a modified flow diagram that illustrates the use of blinding for the transformation engine 130, in accordance with some embodiments of the present disclosure. A description of elements of FIG. 2B that have been previously described will be omitted for brevity. The operations illustrated in FIG. 2B may be utilized, for example, by the system 100 of FIG. 1.

The operations of FIG. 2B differ from those of FIG. 2A in that, rather than sending the data values of the set 150 to the transformation engine 130, the transformation engine 130 and the client computing device 120A jointly execute a 2-party computation protocol (e.g., OPRF protocol 260) by which the client computing device 120A obtains as a result the pseudorandom function computed over its set (transformed set), and the transformation engine 130 does not learn either the original client set 150 or its transformed version 152. In some embodiments, the OPRF protocol 260 may utilize the Diffie-Hellman OPRF protocol to blind and/or transform the client set 150A.

In the Diffie-Hellman Oblivious PRF, the first client computing device 120A has an input set 150A of $\{x_1, x_2, \ldots, x_n\}$ and generates a set of random numbers 3 such that a hash function $H_1$ is defined as:

$$\forall i, 1 \le i \le n$$
$$\beta_i \xleftarrow{R} \mathbb{Z}_q$$
$$a_i = H_1(x_i)^{\beta_i}$$

Using the hash function $H_1$, a set of intermediate values 250 of $\{a_1, a_2, \ldots, a_n\}$ may be generated from the original set 150 of $\{x_1, x_2, \ldots, x_n\}$. The intermediate values 250 (e.g., first intermediate values 250A from the first client computing device 120A) may be sent to the transformation engine 130 rather than the set 150 itself. The transformation engine 130 may perform an OPRF protocol 260 with the first client computing device 120A that incorporates a transformation 222 on the first intermediate values 250A from the first computing device 120A based on the key 132 to return first transformed intermediate values 252A of $\{a_1', a_2', \ldots, a_n'\}$. The first transformed intermediate values 252A may be based on a PRF operation that is a combination of the intermediate values 250A and a second transformation performed by the transformation engine 130.

At operation 240A, the first transformed values 152A may be generated from the first transformed intermediate values 252A. That is to say that the blinding done in operation 230A may be reversed using a second hash function $H_2$. In some embodiments, the second hash function $H_2$ may also be set up as a random oracle. Thus, for a given set of first transformed intermediate values 252A from the transformation engine 130 of $\{a_1', a_2', \ldots, a_n'\}$, the first client computing device 120A may perform the following operation:

$$\forall i, 1 \le i \le n$$
$$a_i'' = H_2\big((a_i')^{1/\beta_i}\big)$$

to generate the first transformed values 152A. The first transformed values 152A may then be sent to the evaluation engine 140 in a similar manner as described above with respect to FIG. 2A.

The operations of generating the second transformed values 152B may be repeated by the second client computing device 120B. Namely, at operation 230B, the second client computing device 120B may generate second intermediate values 250B from its set 150B, e.g., using a hash function such as the first hash function $H_1$ described above. The second intermediate values 250B may then be sent to the transformation engine 130, which may perform a transformation 224 on the second intermediate values 250B from the second computing device 120B based on the key 132 to generate second transformed intermediate values 252B. The second transformed intermediate values may then be converted to the second transformed values 152B at operation 240B, e.g., using a hash function such as the second hash function $H_2$ described above.

The use of the blinding described in FIG. 2B may allow for the operations of the transformation engine 130 to be utilized without transferring the actual values of the set 150 to the transformation engine 130. The use of the two hash functions $H_1$ and $H_2$ allows for the resulting transformed values 152 to be generated in a way that still allows the results to be compared by the evaluation engine 140. Thus, the operations of the evaluation engine 140 illustrated in FIG. 2A may still be performed on the transformed values 152A, 152B to determine if an intersection exists between the sets 150A, 150B of the first and second client computing devices 120A, 120B.

Figure 2C:
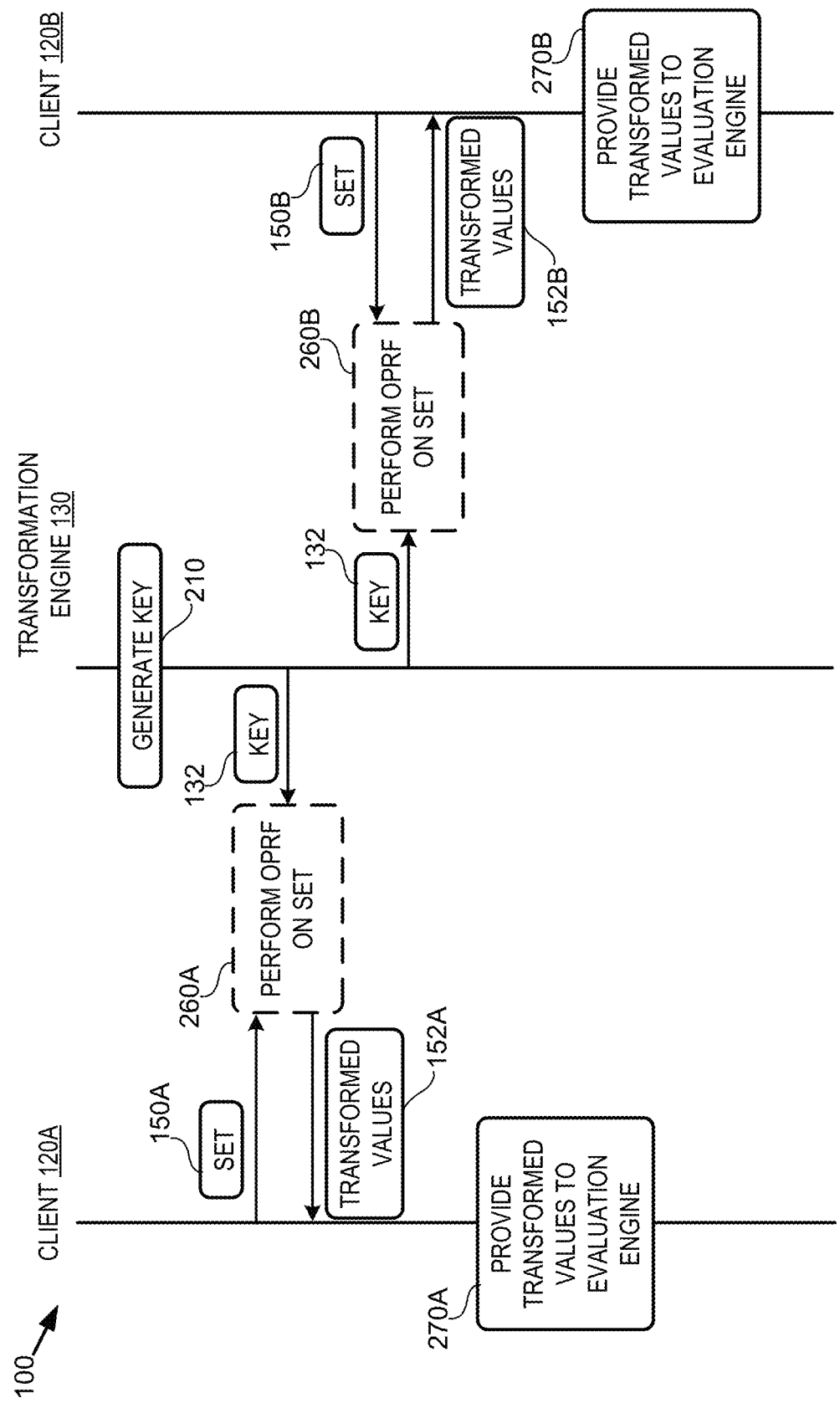
FIG. 2C is a modified flow diagram that illustrates the use of the OPRF protocol for the transformation engine.

FIG. 2C is a modified flow diagram that illustrates the use of the OPRF protocol for the transformation engine 130, in accordance with some embodiments of the present disclosure. A description of elements of FIG. 2C that have been previously described will be omitted for brevity. The operations illustrated in FIG. 2C may be utilized, for example, by the system 100 of FIG. 1.

The operations of FIG. 2C illustrates that the embodiments of the present disclosure are not limited to an OPRF protocol 260 similar to the Diffie-Hellman OPRF protocol illustrated with respect to FIG. 2B. In some embodiments, any OPRF protocol 260 may be utilized between the client computing devices 120 and the transformation engine 130. For example, as shown in FIG. 2C in conjunction with FIG. 1, the client computing devices 120 and the transformation engine 130 may utilize the OPRF protocol 260 to transform a set 150 into a transformed set 152 of values.

For example, referring to FIG. 2C, the first client computing device 120A may perform a first OPRF protocol 260A in conjunction with the transformation engine 130 on its set 150A and the key 132 of the transformation engine 130. The first OPRF protocol 260A may result in the set of transformed values 152A, as described herein.

The first client computing device 120A may provide the transformed values 152A to the evaluation engine 140 at operation 270A. The evaluation engine 140 may compare the transformed values from the first client computing device 120A with other transformed values 152 from other client computing devices 120 to determine if values within the transformed values 152A received from the first OPRF protocol 260A are present in the transformed values 152 of other client computing devices 120.

Similarly, the second client computing device 120B may perform a second OPRF protocol 260B in conjunction with the transformation engine 130 on its set 150B and the key 132 of the transformation engine 130. The second OPRF protocol 260A may result in the second set of transformed values 152B, as described herein. The second client computing device 120 may provide the received second set of transformed values 152B to the evaluation engine 140 at operation 270B, for comparison with the transformed values 152 of other client computing devices 120 (such as the first client computing device 120A).

The embodiments of FIGS. 2A, 2B and 2C provide a number of benefits. First, the client computing devices 120 are able to learn about intersections (e.g., repeats) within their sets 150 of data values without having to identify themselves to the other client computing devices 120. By performing a PSI that utilizes the OPRF protocol 260, the client computing devices 120 may learn both that there is an intersection with their set 150 and another set 150 of another client computing device 120 as well as which of the elements of the set 150 are within the intersection (e.g., which values are repeated). Using the example of passwords, the first client computing device 120A may learn that one of its passwords is in use on another client computing device 120, but may not learn which client computing device 120 it is.

In addition, since the evaluation engine 140 is only provided transformed values 152, it may be able to calculate the intersection of the various sets 150 without seeing the original values of the set 150. In the example of passwords, this may mean that the evaluation engine 140 may be able to calculate the intersection without seeing any of the passwords. As a result, in cases where a blinded set is used, as in FIG. 2B, a client computing device 120 may be able to receive information related to the intersection of its set 150 with other client computing devices 120 without providing the actual values of the set 150 to another entity (e.g., the transformation engine 130), which may further enhance security.

Referring back to FIG. 1, the system 100 may provide the ability for the various client computing devices 120 to determine intersections in their various sets 150 utilizing a PRF, which could be obtained and/or computed via an OPRF protocol, as described herein. Though an OPRF protocol utilizing blinded exponentiation is described with respect to FIGS. 2A and 2B, the embodiments of the present disclosure are not limited to such an embodiment. In some embodiments, other types of OPRFs may be used, such as constructions based on oblivious transfer and homomorphic encryption, to name just two examples.

As transformed sets 152 (e.g., transformed sets 152A, 152B, . . . , 152N) are generated by the transformation engine 130 and provided to the evaluation engine 140, they may be stored within a transformation store 142. Thus, as a new client computing device 120 is added to the network 102, it may communicate with the transformation engine 130 to generate a transformed set 152 based on its set 150 of data values, and may provide this transformed set 152 to the evaluation engine 140, which may compare the values of the transformed set 152 to the values within its transformation store 142.

In some embodiments, the key 132 and/or the transformation store 142 may be deleted and/or regenerated. Regenerating the key 132 may render prior computations moot, such that any new transformed sets 152 using the new key 132 may not be compared against prior transformed set 152 utilized the prior key 132. However, generating a new key 132 and/or transformation store 142 may prevent and/or reduce security issues that may arise from having the transformed sets 152 in storage. Also, regenerating the key 132 periodically may reduce a time window over which the key 132 can be deduced/cracked and utilized to attempt to decrypt the original values of the sets 150. In some embodiments, the key 132 and/or the transformation store 142 may be deleted and/or regenerated periodically (e.g., every day, every week, etc.). In some embodiments, the key 132 and/or the transformation store 142 may be deleted and/or regenerated in response to events, such as with the detection of a new client computing device 120 within the network 102.

Figure 3:
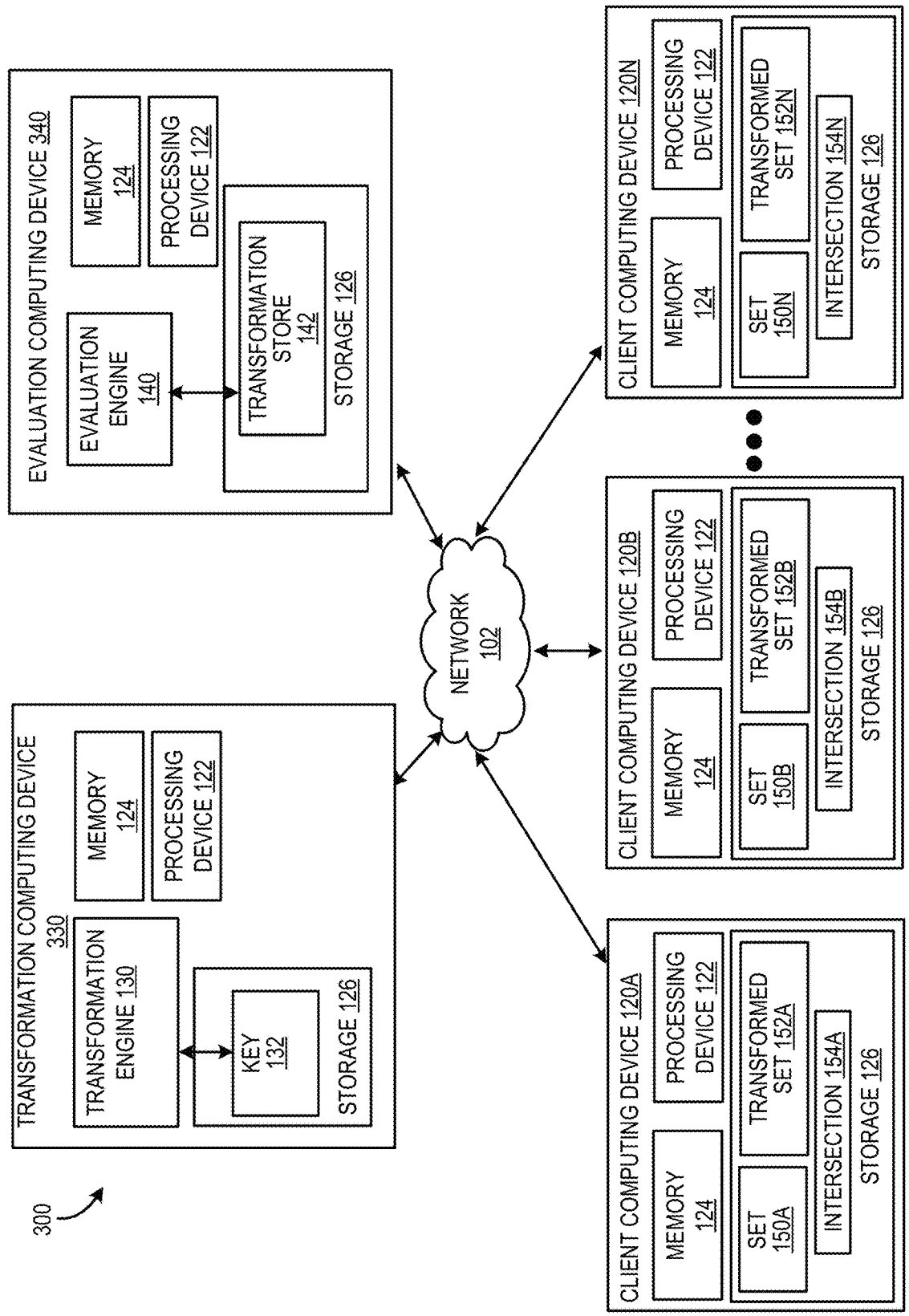
FIG. 3 is a block diagram of a system in which the transformation engine and the evaluation engine may be provided on separate computing devices, in accordance with some embodiments of the present disclosure.

In the example of FIG. 1, the transformation engine 130 and the evaluation engine 140 are provided on a same intersection computing device 110. However, the embodiments of the present disclosure are not limited to such a configuration. FIG. 3 is a block diagram of a system 300 in which the transformation engine 130 and the evaluation engine 140 may be provided on separate computing devices, in accordance with some embodiments of the present disclosure. A description of elements of FIG. 3 that have been previously described will be omitted for brevity.

Referring to FIG. 3, the transformation engine 130 may be provided as part of a transformation computing device 330 and the evaluation engine 140 may be provided as part of an evaluation computing device 340. In some embodiments, the transformation computing device 330 and the evaluation computing device 340 may be different physical machines, though the embodiments of the present disclosure are not limited to such a configuration. In some embodiments, the transformation computing device 330 and the evaluation computing device 340 may be different virtual machines on a same physical device. In some embodiments, the transformation computing device 330 and the evaluation computing device 340 may be implemented by a common entity/organization or may be implemented by different entities/organizations.

Each of the transformation computing device 330 and the evaluation computing device 340 may include a memory 124, a processing device 122, and/or storage 126, as described herein with respect to FIG. 1. In some embodiments, the configuration of the memory 124, the processing device 122, and/or the storage 126 of the transformation computing device 330 may be different from that of the evaluation computing device 340.

The transfer of the sets 150 (or intermediate sets 250) to the transformation engine 130 may be performed to the transformation computing device 330 in a similar manner as described herein with respect to FIGS. 2A to 2C. Namely, the sets 150 (or intermediate sets 250) may be transferred to the transformation engine 130 of the transformation computing device 330 over the network 102, and an OPRF protocol incorporating a PRF operation may be performed on the transferred values based on the key 132.

Similarly, the transfer of the transformed sets 152 to the evaluation engine 140 may be performed to the evaluation computing device 340 in a similar manner as described herein with respect to FIGS. 2A to 2C. Namely, transformed sets 152 may be transferred to the evaluation engine 140 of the evaluation computing device 340 over the network 102, and an intersection 154 between the transformed sets 152 and the transformation store 142 may be identified and returned to the client computing device 120.

The separated configuration of the system 300 may provide additional security benefits. By separating the transformation engine 130 and the evaluation engine 140 onto different computing devices 330, 340, the key 132 may be separated (e.g., physically) from the transformation store 142. In some embodiments, the transformed sets 152 stored in the transformation store 142 may be possibly decrypted if the key 132 is known. Thus, if the transformation engine 130 and the evaluation engine 140 are on a same computing device, it may be possible for the values of the transformed sets 152 to be determined if that computing device is accessed by an unauthorized entity, or is a bad actor. Separating the key 132 from the transformation store 142 may reduce and/or prevent a possibility of the transformed sets 152 of the transformation store 142 from be decrypted using the key 132. As an example, even if one of the transformation engine 130 or the evaluation engine 140 is compromised, the intruder still would not have enough information to determine information specific to the sets 150 of the client computing devices 120.

Figure 4:
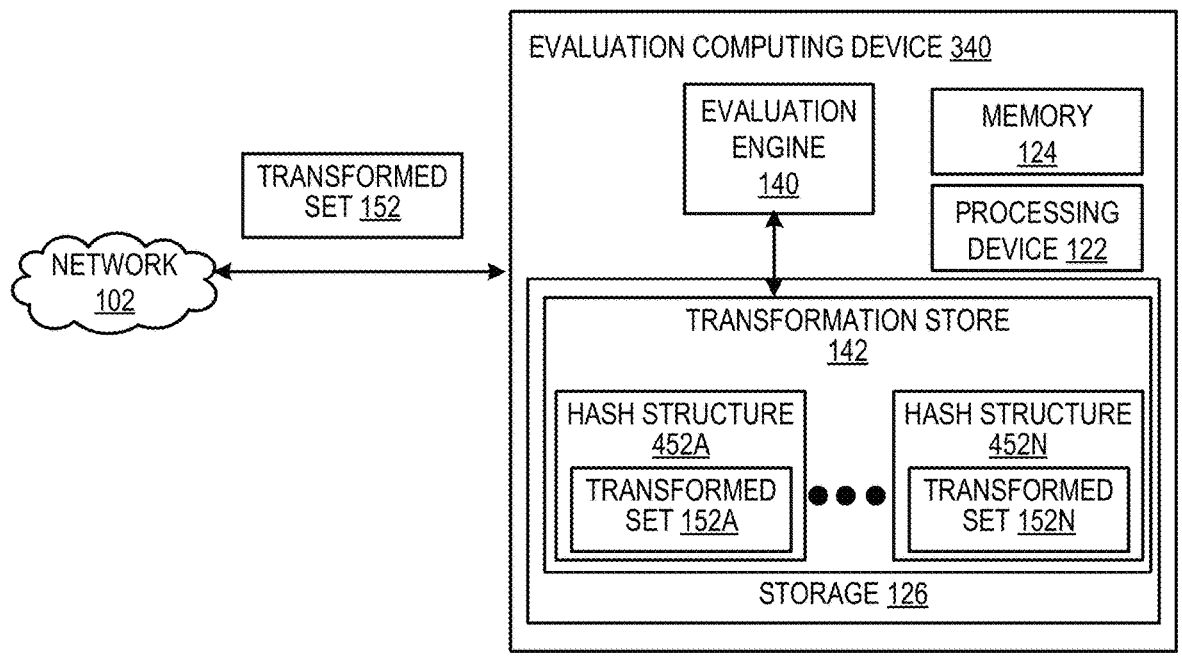
FIG. 4 is a block diagram of an example of an evaluation engine utilizing a hash structure for each client computing device, in accordance with some embodiments of the present disclosure.

In some embodiments, the sets 150 (and therefore the transformed sets 152) may be very large. As a result, it may be useful to provide additional performance enhancements to increase the speed of operations. FIG. 4 is a block diagram of an example of an evaluation engine 140 utilizing a hash structure for each client computing device 120, in accordance with some embodiments of the present disclosure. A description of elements of FIG. 4 that have been previously described will be omitted for brevity.

FIG. 4 illustrates a portion of the communication discussed herein with respect to FIGS. 1 to 3. Namely, FIG. 4 illustrates scenarios in which the evaluation engine 149 receives a transformed set 152 of values (e.g., a first transformed set 152A) from a client computing device 120. In the embodiment of FIG. 4, the evaluation engine 140 is illustrated as executing within the separate evaluation computing device 340 described with respect to FIG. 3. However, it will be understood that the hashing techniques discussed with respect to FIG. 4 may also be implemented in solutions in which the evaluation engine 140 and the transformation engine 130 share a common computing device (e.g., the intersection computing device 110 of FIG. 1) but are logically isolated from one another.

Referring to FIG. 4, in some embodiments, the transformed set 152 may be transmitted to the evaluation engine 140 for each of the client computing devices 120, and the evaluation engine 140 may insert the transformed sets 152 into separate hash structures 452 within its transformation store 142. In some embodiments, the client computing devices 120 may store the transformed sets 152 in separate hash structures 452 (e.g., within the storage device 126 of the client computing device 120), and the separate hash structures 452 themselves may be sent directly from the client computing devices 120 to the evaluation engine 140.

The respective hash structures 452 may allow the transformed sets 152 to be stored more efficiently for searching. In some embodiments, the hash structure 452 may instantiate a hash filter. A hash filter creates a hash sum from data and compares the sum against other previously defined sums. Depending on the purpose of the filter, the data can then be included or excluded in a function based on whether it matches an existing sum. A hash filter may allow for large amounts of data to be stored efficiently and searched quickly. For example, a hash filter may allow for a given value to be quickly tested to determine if it is in the hash filter, without requiring that every member of the data of the hash filter be individually compared.

For example, referring to FIGS. 1 and 3, a first client computing device 120A may take the first transformed set 152A of data elements based on the pseudorandom function of the transformation engine 130, and then transmit (e.g., over the network 102) the first transformed set 152A to the evaluation engine 140. The evaluation engine 140 may store the first transformed set 152 into a first hash structure 452A that is associated with the first client computing device 120A. The first hash structure 452A may allow for all of the data elements of the first transformed set 152A to be searched quickly and efficiently using a hash filter.

The evaluation engine 140 may receive a transformed set 152 from each of the client computing devices 120. For example, the evaluation engine 140 may receive the first transformed set 152A of data values from the first client computing device 120A, which may be stored in the first hash structure 452A, up to an Nth transformed set 152N of data values from an Nth client computing device 120N, which may be stored in an Nth hash structure 452N. In some embodiments, rather than receiving the transformed set 152 from each of the client computing devices 120, the evaluation engine 140 may receive the hash structure 452 itself. For example, the first hash structure 452A may be received from the first client computing device 120, up to the Nth hash structure 452N from the Nth client computing device 120N.

When computing the intersection of a received transformed set 152 of data elements with the transformed sets 152 of the transformation store 142, the evaluation engine 140 may compare each data value of the received transformed set 152 with each of the separate hash structures 452. For example, each data value of the received transformed set 152 may be tested against the first hash structure 452A of the first client computing device 120. The comparison may be repeated for each of the hash structures 452 of the transformation store 142 up to the Nth hash structure 452N. Thus, for N hash structures 452, each value of the incoming transformed set 152 may be compared N times (e.g., once per hash structure 452). Once compared, the received data value of the incoming transformed set 152 may be added to a hash structure 452 in the transformation store 142 that is associated with the client computing device 120 from which the incoming transformed set 152 is received, and utilized in subsequent operations.

In some embodiments, the hash structure 452 may be a Cuckoo hash filter. Cuckoo filters are data structures for compact set representation that allow for fast membership testing with controllable false possibility probability (FPP). They have fast lookups(O(1)), deletions (O(1)) and insertions (O(1) amortized expected, with reasonable high probability if load is well managed). Cuckoo filters consist of a table of buckets with fixed bucket size b. Inside the buckets, so-called tags are stored. Tags are small bit strings obtained by hashing items. For example, to represent an item x in a Cuckoo filter, its tag $t_x=H_t(x)$, where $H_t$ is a hash function with output bit length v. This tag may be stored in one out of two possible buckets. The position of the first possible bucket is calculated as $p_1=H(x)$, where H is another hash function that maps the input to a position in the table of buckets. In case this bucket is already full, the tag is stored in the second possible bucket at position $p_2=p_1 \oplus H(t_x)$. Note that it is always possible to determine the other candidate bucket $p_j$ just from knowing its tag $t_x$ and the current position $p_i$: $p_j=p_i \oplus H(t_x)$. If both buckets are full, one tag in one of the buckets is chosen at random, removed from that bucket, and moved to its other possible bucket. This procedure is repeated recursively until no more relocations are necessary.

To check whether an item is contained in the Cuckoo filter, one computes its tag and both possible bucket locations and compares the tags stored there for equality. For deleting the item, the matching tag is removed from the filter. Due to hash collisions, two items may produce equal tags. As a consequence, lookups can lead to false positives. The false positive probability $e_{max}$ is mainly dependent on the tag size v and also slightly on the bucket size b since larger buckets result in more possible collisions within each bucket.

As an example of an embodiment in which the hash structure 452 is a Cuckoo filter, pseudocode for an operation to test an intersection of n data elements of a transformed set 152 against m other hash structures 452 (denoted as cf) from m client computing devices 120 may be of the form:

$\forall j, 1 \leq j \leq m$
$\forall i, 1 \leq i \leq n$

If $cf_j.Check(\alpha''_i)$ then
Return j, i

When using a Cuckoo filter, operations to add data elements of a transformed set 152 of values into a respective hash associated with an $(m+1)^{st}$ client computing device 120 may be implemented by the following example pseudocode:

$\forall i, 1 \leq i \leq n$
$cf_{m+1}.Insert(\alpha''_i)$ then
$CF.add(cf_{m+1})$ Though some embodiments of the hash structure 452 may be a Cuckoo hash filter, the embodiments of the present disclosure are not limited to this configuration. In some embodiments the hash structure 452 may be another type of hash filter, such as a bloom filter. Other types of hash structures 452 may be possible without deviating from the scope of the present disclosure.

Figure 5:
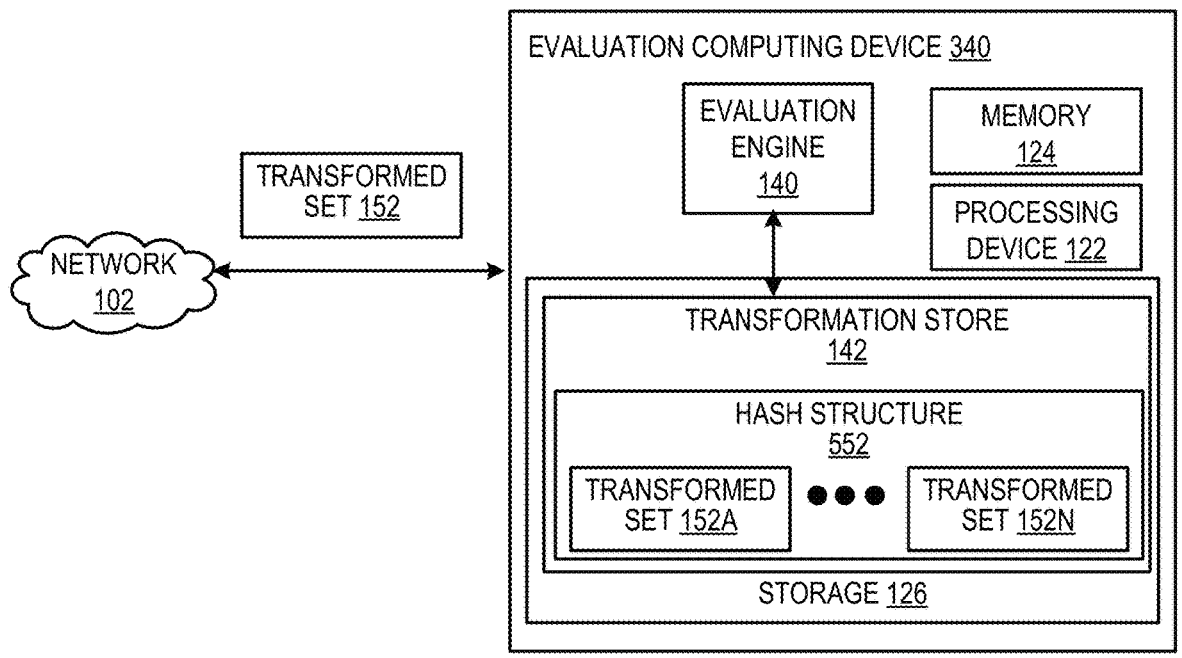
FIG. 5 is a block diagram of an example of an evaluation engine utilizing a common hash structure, in accordance with some embodiments of the present disclosure.

In some embodiments, it may be useful to implement a common hash filter, rather than individual hash filters for each of the computing devices 120. FIG. 5 is a block diagram of an example of an evaluation engine 140 utilizing a common hash structure, in accordance with some embodiments of the present disclosure. A description of elements of FIG. 5 that have been previously described will be omitted for brevity.

FIG. 5 illustrates a portion of the communication discussed herein with respect to FIGS. 1 to 3. Namely, FIG. 5 illustrates scenarios in which the evaluation engine 149 receives a transformed set 152 of values from a client computing device 120. In the embodiment of FIG. 5, the evaluation engine 140 is illustrated as executing within the separate evaluation computing device 340 described with respect to FIG. 3. However, it will be understood that the hashing techniques discussed with respect to FIG. 5 may also be implemented in solutions in which the evaluation engine 140 and the transformation engine 130 share a common computing device (e.g., the intersection computing device 110 of FIG. 1) but are logically isolated from one another.

Referring to FIG. 5, in some embodiments, the transformed set 152 may be transmitted to the evaluation engine 140 for each of the client computing devices 120, and the evaluation engine 140 may insert the transformed set 152 into a single common hash structure 552 within its transformation store 142. For example, each of the transformed sets 152 from the plurality of client computing devices 120 may each be sent to the evaluation engine 140 and inserted into a common hash structure 552 that may be searched for an intersection. As with the hash structure 452 of FIG. 4, the common hash structure 552 may allow all of the transformed set 152 to be stored more efficiently for searching.

The evaluation engine 140 may receive a transformed set 152 from each of the client computing devices 120. For example, the evaluation engine 140 may receive the first transformed set 152A of data values from the first client computing device 120A up an Nth transformed set 152N of data values from an Nth client computing device 120A. Each of these transformed sets 152 may be inserted into the common hash structure 552. In some embodiments, the values of the transformed sets 152 may be inserted into the common hash structure along with an identifier of the client computing device 120 from which the values of the transformed sets were received. When computing the intersection of a received transformed set 152 of data elements with the transformed sets 152 of the transformation store 142, the evaluation engine 140 may compare each data value of the received transformed set 152 with the common hash structure 552. Thus, each value of the incoming transformed set 152 must be compared only a single time against the common hash structure 552. If a matching value is found within the common hash structure 552, the identifier(s) associated with the client computing devices 120 of the matching value may be utilized to determine which client computing devices 120 have an intersection with the incoming transformed set 152. Once compared, the received transformed set 152 of data elements may be added to the common hash structure 552 of the transformation store 142 and utilized in subsequent operations.

Figure 6:
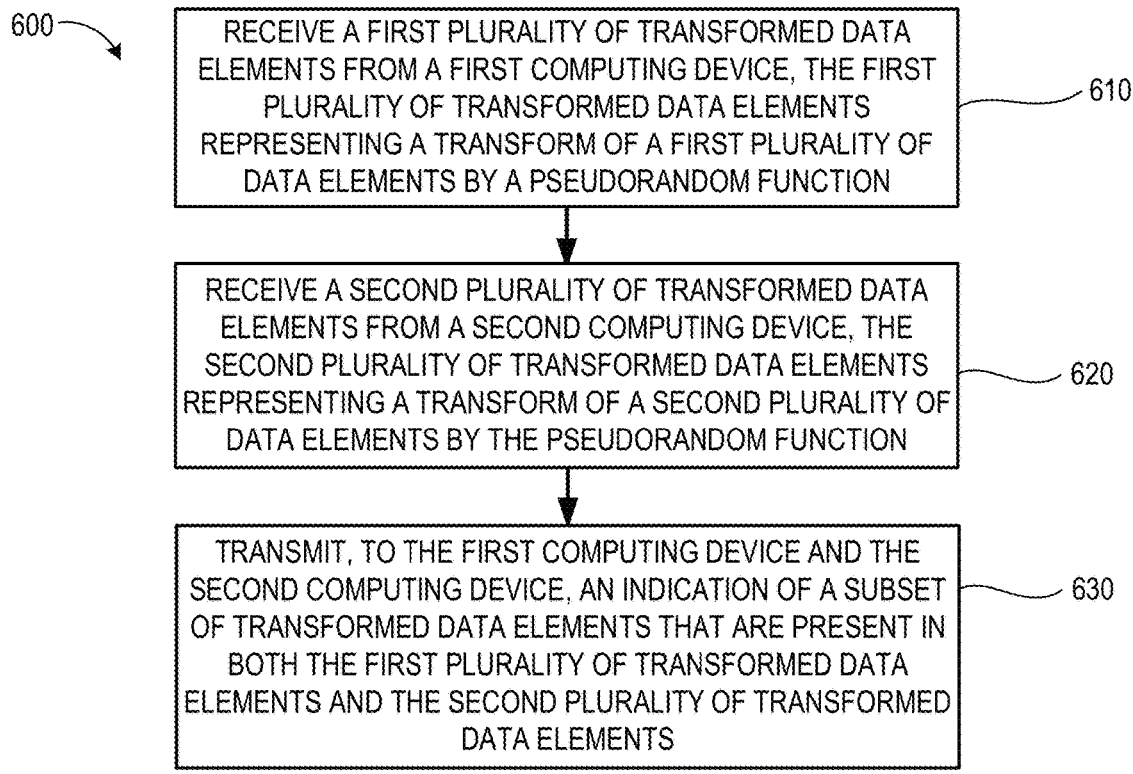
FIG. 6 is a flow diagram of a method for performing a delegated PSI, in accordance with some embodiments of the present disclosure.

FIG. 6 is a flow diagram of a method 600 for performing a delegated PSI, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., intersection computing device 110, transformation computing device 330, and/or evaluation computing device 340).

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring simultaneously to the prior figures as well, the method 600 begins at block 610, which includes receiving a first plurality of transformed data elements from a first computing device, the first plurality of transformed data elements representing a transform by a pseudorandom function of a first plurality of data elements. In some embodiments, the first plurality of transformed data elements from a first computing device may be similar to the transformed set of values 152 (e.g., the first transformed set of values 152A) from a client computing device 120 (e.g., the first client computing device 120A) described herein with respect to FIGS. 1 to 5. In some embodiments, the first plurality of data elements may be similar to the set of values 150 (e.g., the first set of values 150A) described herein with respect to FIGS. 1 to 5. In some embodiments, the first plurality of transformed data elements and the second plurality of transformed data elements are obtained via an oblivious pseudorandom function (ORPF) protocol. In some embodiments, the first plurality of transformed data elements and the second plurality of transformed data elements correspond to a first and second set of passwords of the first and second computing devices, respectively.

At block 620, operations of the method 600 may include receiving a second plurality of transformed data elements from a second computing device, the second plurality of transformed data elements representing a transform by the pseudorandom function of a second plurality of data elements. In some embodiments, the second plurality of transformed data elements from a second computing device may be similar to the transformed set of values 152 (e.g., the second transformed set of values 152B) from a client computing device 120 (e.g., the second client computing device 120B) described herein with respect to FIGS. 1 to 5. In some embodiments, the second plurality of data elements may be similar to the set of values 150 (e.g., the second set of values 150B) described herein with respect to FIGS. 1 to 5.

In some embodiments, the OPRF protocol comprises a Diffie-Hellman OPRF protocol. In some embodiments, the method further includes generating a key for the pseudorandom function of the OPRF protocol, wherein the key is concealed from the first and second computing devices; receiving a first plurality of intermediate transformed data elements from the first computing device, the first plurality of intermediate transformed data elements representing a transform of the first plurality of data elements by the first computing device; providing the key and the first plurality of intermediate transformed data elements to the pseudorandom function to generate the first plurality of transformed data elements; and transmitting the first plurality of transformed data elements to the first computing device. In some embodiments, the key may be similar to the key 132 described herein with respect to FIGS. 1 to 5. In some embodiments, the first plurality of intermediate transformed data elements may be similar to the transformed intermediate values 252 (e.g., the first transformed intermediate values 252A) described herein with respect to FIG. 2B. In some embodiments, a third computing device that generates the key for the pseudorandom function is different from a fourth computing device that receives the first and second plurality of transformed data elements. In some embodiments, the third computing device may be similar to the transformation computing device 330 described herein with respect to FIG. 3. In some embodiments, the fourth computing device may be similar to the evaluation computing device 340 described herein with respect to FIG. 3.

At block 630, operations of the method 600 may include transmitting, to the first computing device and the second computing device, an indication of a subset of transformed data elements that are present in both the first plurality of transformed data elements and the second plurality of transformed data elements. In some embodiments, the indication of a subset of transformed data elements may be similar to the intersection 154 (e.g., the first intersection 154A and/or the second intersection 154B) described herein with respect to FIGS. 1 to 5.

In some embodiments, the method further includes inserting the first plurality of transformed data elements into a first hash structure and the second plurality of transformed data elements into a second hash structure; and determining the subset of transformed data elements that are present in both the first plurality of transformed data elements and the second plurality of transformed data elements by analyzing the first and second hash structures. In some embodiments, the first hash structure and the second hash structure may be similar to the hash structures 452 (e.g., 452A, . . . , 452N) described herein with respect to FIG. 4.

In some embodiments, the method further includes inserting the first and second plurality of transformed data elements into a common hash structure, and determining the subset of transformed data elements that are present in both the first plurality of transformed data elements and the second plurality of transformed data elements by analyzing the common hash structure. In some embodiments, the common hash structure may be similar to the common hash structure 552 described herein with respect to FIG. 5.

Figure 7:
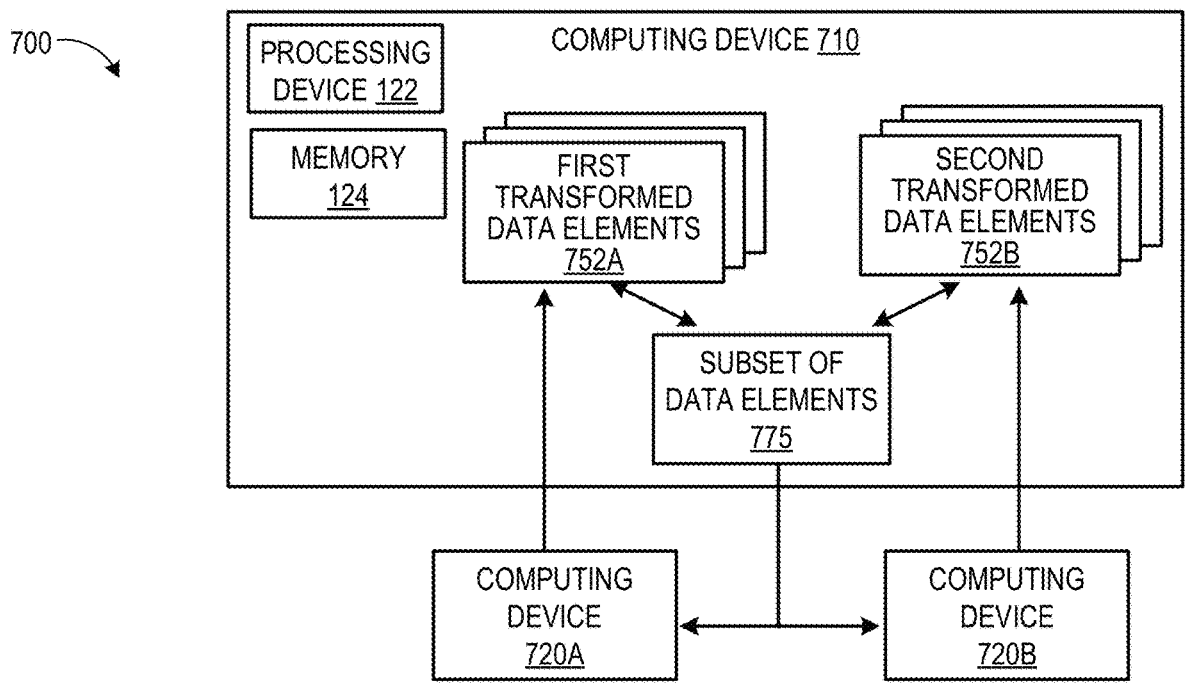
FIG. 7 is a component diagram of an example of a device architecture for private set intersection (PSI), in accordance with embodiments of the disclosure.

FIG. 7 is a component diagram of an example of a device architecture 700 for private set intersection (PSI), in accordance with embodiments of the disclosure. The device architecture 700 includes computing device 710 having processing device 122 and memory 124, as described herein with respect to FIGS. 1 to 6.

Referring to FIG. 7, the computing device 710 may receive a first plurality of transformed data elements 752A from a first computing device 720A, the first plurality of transformed data elements 752A representing a transform by a pseudorandom function of a first plurality of data elements. In some embodiments, the first plurality of transformed data elements 752A from a first computing device 720A may be similar to the transformed set of values 152 (e.g., the first transformed set of values 152A) from a client computing device 120 (e.g., the first client computing device 120A) described herein with respect to FIGS. 1 to 6. In some embodiments, the first plurality of data elements may be similar to the set of values 150 (e.g., the first set of values 150A) described herein with respect to FIGS. 1 to 6. In some embodiments, the first plurality of transformed data elements 752A are obtained via an oblivious pseudorandom function (OPRF) protocol.

The computing device 710 may receive a second plurality of transformed data elements 752B from a second computing device 720B, the second plurality of transformed data elements 752B representing a transform of a second plurality of data elements by the pseudorandom function. In some embodiments, the second plurality of transformed data elements 752B from a second computing device 720B may be similar to the transformed set of values 152 (e.g., the second transformed set of values 152B) from a client computing device 120 (e.g., the second client computing device 120B) described herein with respect to FIGS. 1 to 6. In some embodiments, the second plurality of transformed data elements 752B are obtained via the oblivious pseudorandom function (OPRF) protocol.

The computing device 710 may transmit, to the first computing device 720A and the second computing device 720B, an indication of a subset of transformed data elements 775 that are present in both the first plurality of transformed data elements 752A and the second plurality of transformed data elements 752B. In some embodiments, the indication of a subset of transformed data elements 775 may be similar to the intersection 154 (e.g., the first intersection 154A and/or the second intersection 154B) described herein with respect to FIGS. 1 to 6.

The device architecture 700 of FIG. 7 provides an improved capability for detection of an intersection of a plurality of private sets. The device architecture 700 may provide a mechanism by which multiple computing devices 720A, 720B are able to determine if any element in their set of private data is shared with another computing device, without sharing the contents of the private data. Moreover, the intersection may be determined without identifying the party with the shared value. In some embodiments, the generation of the first and second transformed data elements 752A, 752B may be separated from the evaluation of the intersection of the subset of transformed data elements 775, which may reduce a possibility that the underlying data elements may be discovered. In some embodiments, the underlying data elements may be passwords, or other secure data, and the embodiments of the present disclosure may allow for them to be compared without risking a breach of the underlying information. Thus, embodiments of the device architecture 700 improve the technology associated with computer security, and improve the operation of the computing device 710 by allowing for the subset of transformed data elements 775 to be discovered more efficiently than typical techniques.

Figure 8:
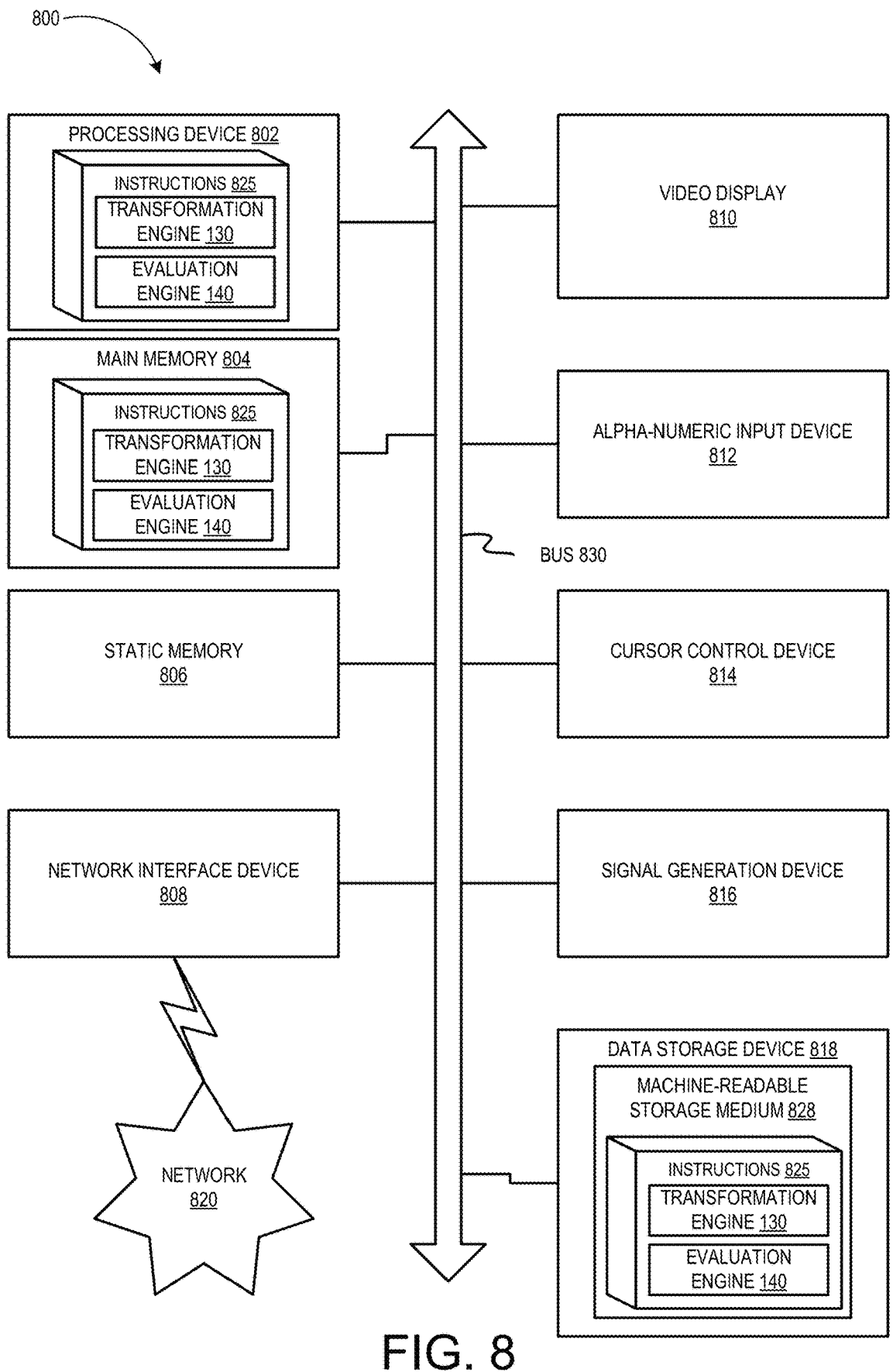
FIG. 8 is a block diagram of an example computing device that may perform one or more of the operations described herein, in accordance with embodiments of the disclosure.

FIG. 8 is a block diagram of an example computing device 800 that may perform one or more of the operations described herein, in accordance with some embodiments of the disclosure. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory) and a data storage device 818, which may communicate with each other via a bus 830.

Processing device 802 may be provided by one or more general-purpose processing devices such as a microprocessor, central processing unit, or the like. In an illustrative example, processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also include one or more special-purpose processing devices such as an application specific integrated circuit (ASIC), a field programmable gate array (FPGA), a digital signal processor (DSP), network processor, or the like. The processing device 802 may execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for a transformation engine 130 and/or an evaluation engine 140 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "transmitting," "generating," "providing," "inserting," "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the term "engine" is not intended to be limiting of any particular implementation for accomplishing and/or performing the actions, operations, processes, etc., attributable to and/or performed by the engine. An engine may be, but is not limited to, software, hardware and/or firmware or any combination thereof that performs the specified functions including, but not limited to, any use of a general and/or specialized processing device in combination with appropriate software loaded or stored in a machine readable memory and executed by the processing device. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, at a third computing device, a first plurality of transformed data elements from a first computing device, the first plurality of transformed data elements representing a transform by a pseudorandom function of a first plurality of data elements;
receiving, at the third computing device, a second plurality of transformed data elements from a second computing device, the second plurality of transformed data elements representing a transform by the pseudorandom function of a second plurality of data elements, wherein an identity of the first computing device is unknown to the second computing device and an identity of the second computing device is unknown to the first computing device; and
transmitting, by a processing device executing on the third computing device to the first computing device and the second computing device, an indication of a subset of transformed data elements that are present in both the first plurality of transformed data elements and the second plurality of transformed data elements.

2. The method of claim 1, wherein the first plurality of transformed data elements and the second plurality of transformed data elements are obtained via an oblivious pseudorandom function (OPRF) protocol.

3. The method of claim 2, wherein the OPRF protocol comprises a Diffie-Hellman OPRF protocol.

4. The method of claim 3, wherein a fourth computing device that generates a key utilized by the pseudorandom function is different from the third computing device that receives the first and second plurality of transformed data elements.

5. The method of claim 1, further comprising:
inserting the first plurality of transformed data elements into a first hash structure and the second plurality of transformed data elements into a second hash structure; and
determining the subset of transformed data elements that are present in both the first plurality of transformed data elements and the second plurality of transformed data elements by analyzing the first and second hash structures.

6. The method of claim 1, further comprising:
inserting the first and second plurality of transformed data elements into a common hash structure; and
determining the subset of transformed data elements that are present in both the first plurality of transformed data elements and the second plurality of transformed data elements by analyzing the common hash structure.

7. The method of claim 1, wherein the first plurality of transformed data elements and the second plurality of transformed data elements correspond to a first and second set of passwords of the first and second computing devices, respectively.

8. A system comprising:
a memory; and
a processing device, operatively coupled to the memory, to:
receive, at the system, a first plurality of transformed data elements from a first computing device, the first plurality of transformed data elements representing a transform by a pseudorandom function of a first plurality of data elements;
receive, at the system, a second plurality of transformed data elements from a second computing device, the second plurality of transformed data elements representing a transform by the pseudorandom function of a second plurality of data elements, wherein an identity of the first computing device is unknown to the second computing device and an identity of the second computing device is unknown to the first computing device; and
transmit, from the system to the first computing device and the second computing device, an indication of a subset of transformed data elements that are present in both the first plurality of transformed data elements and the second plurality of transformed data elements.

9. The system of claim 8, wherein the first plurality of transformed data elements and the second plurality of transformed data elements are obtained via an oblivious pseudorandom function (OPRF) protocol.

10. The system of claim 9, wherein the OPRF protocol comprises a Diffie-Hellman OPRF protocol.

11. The system of claim 10, wherein a fourth computing device that generates a key utilized by the pseudorandom function is different from the system that receives the first and second plurality of transformed data elements.

12. The system of claim 8, further wherein the processing device is further to:
insert the first plurality of transformed data elements into a first hash structure and the second plurality of transformed data elements into a second hash structure; and
determine the subset of transformed data elements that are present in both the first plurality of transformed data elements and the second plurality of transformed data elements by analyzing the first and second hash structures.

13. The system of claim 8, wherein the processing device is further to:
insert the first and second plurality of transformed data elements into a common hash structure; and
determine the subset of transformed data elements that are present in both the first plurality of transformed data elements and the second plurality of transformed data elements by analyzing the common hash structure.

14. The system of claim 8, wherein the first plurality of transformed data elements and the second plurality of transformed data elements correspond to a first and second set of passwords of the first and second computing devices, respectively.

15. A non-transitory computer-readable storage medium including instructions that, when executed by a processing device, cause the processing device to:
receive, at a third computing device, a first plurality of transformed data elements from a first computing device, the first plurality of transformed data elements representing a transform by a pseudorandom function of a first plurality of data elements;

receive, at the third computing device, a second plurality of transformed data elements from a second computing device, the second plurality of transformed data elements representing a transform by the pseudorandom function of a second plurality of data elements, wherein an identity of the first computing device is unknown to the second computing device and an identity of the second computing device is unknown to the first computing device; and transmit, by the processing device executing on the third computing device to the first computing device and the second computing device, an indication of a subset of transformed data elements that are present in both the first plurality of transformed data elements and the second plurality of transformed data elements.

16. The non-transitory computer-readable storage medium of claim 15, wherein the first plurality of transformed data elements and the second plurality of transformed data elements are obtained via an oblivious pseudorandom function (OPRF) protocol.

17. The non-transitory computer-readable storage medium of claim 16, wherein the OPRF protocol comprises a Diffie-Hellman OPRF protocol.

18. The non-transitory computer-readable storage medium of claim 17, wherein a fourth computing device that generates a key utilized by the pseudorandom function is different from the third computing device that receives the first and second plurality of transformed data elements.

19. The non-transitory computer-readable storage medium of claim 15, further wherein the processing device is further to:

insert the first plurality of transformed data elements into a first hash structure and the second plurality of transformed data elements into a second hash structure; and determine the subset of transformed data elements that are present in both the first plurality of transformed data elements and the second plurality of transformed data elements by analyzing the first and second hash structures.

20. The non-transitory computer-readable storage medium of claim 15, wherein the processing device is further to:

insert the first and second plurality of transformed data elements into a common hash structure; and determine the subset of transformed data elements that are present in both the first plurality of transformed data elements and the second plurality of transformed data elements by analyzing the common hash structure.

* * * * *